United States Patent [19]

Murano et al.

[11] Patent Number: 4,621,903
[45] Date of Patent: Nov. 11, 1986

[54] ELECTRO-OPTIC LIGHT SHUTTER

[75] Inventors: Kanji Murano, Nishiminemachi; Susumu Nishigaki, Yokohama; Masami Himuro, Tokyo; Yoshihisa Watanabe, Kawasaki, all of Japan

[73] Assignee: Sony Corporation, Tokyo, Japan

[21] Appl. No.: 568,040

[22] Filed: Jan. 4, 1984

[30] Foreign Application Priority Data

Jan. 14, 1983 [JP] Japan ................................. 58-4513

[51] Int. Cl.$^4$ .............................................. G02F 1/03
[52] U.S. Cl. .................................... 350/390; 350/393
[58] Field of Search .............. 350/374, 384, 387, 389, 350/390, 392, 393, 400, 395, 356, 346, 351, DIG. 1

[56] References Cited

U.S. PATENT DOCUMENTS

| | | | |
|---|---|---|---|
| 3,623,795 | 11/1971 | Taylor et al. | 350/390 |
| 3,666,666 | 5/1972 | Haertling | 350/390 |
| 4,057,324 | 11/1977 | Kawashima et al. | 350/390 |

FOREIGN PATENT DOCUMENTS

| | | | |
|---|---|---|---|
| 57-93317 | 6/1982 | Japan | 350/374 |
| 58-10717 | 1/1983 | Japan | 350/374 |

OTHER PUBLICATIONS

Ames, "Light Switch", IBM Tech. Disclosure Bulletin, Aug. 1960, vol. 3, No. 3, p. 62.

*Primary Examiner*—William H. Punter
*Attorney, Agent, or Firm*—Hill, Van Santen, Steadman & Simpson

[57] ABSTRACT

An electro-optic light shutter is disclosed which includes a ceramic body having electro-optic effect and a pair of electrodes applying A.C. voltage to the ceramic body to cause electro-optic effect, wherein the ceramic body is formed of PLZT ceramics having memory effect at a room temperature and loses the memory effect at an elevated operating temperature caused by application of A.C. voltage to the ceramic body.

8 Claims, 13 Drawing Figures

ELECTRO-OPTIC LIGHT SHUTTER

BACKGROUND OF THE INVENTION

1. Field of the Invention

The present invention relates to an electro-optic light shutter which is made of transparent PLZT ceramics, namely, (Pb, La) (Zr, Ti)O₃ ceramics.

2. Description of the Prior Art

In general, a PLZT ceramic has the following advantages:
(i) it is transparent;
(ii) its optical characteristic can be controlled electrically; and
(iii) its electro-optic constant is large and an element can be formed with ease and at low manufacturing cost.

FIG. 1 is the diagram showing a principle of construction of a PLZT electro-optic light shutter apparatus. In FIG. 1, reference numerals 1 and 2 respectively designate linear polarizers between which an electro-optic light shutter 3 formed of PLZT ceramics is disposed. The electro-optic light shutter 3 comprises a pair of electrodes 4 and 5 disposed on PLZT ceramics 6. The linear polarizers 1 and 2 are disposed in such a manner that the electric field vector directions of the linearly polarized light selected thereby may be perpendicular to each other. The PLZT ceramics of the shutter are disposed in such a manner that the electric field direction, and, the optic axis directions are at 45° to each other. With such arrangement, when a light from the light source S of which the electric field vectors are oriented in every direction is passed through the polarizer 1, the light becomes linearly polarized light. The power of the linearly polarized light passed through the polarizer 1 is reduced to ½ that of the incident light according to theory. As the linearly polarized light passed through the polarizer 1 advances through the PLZT plate 6 of the shutter 3, the electric field vector of the polarized light is rotated depending on the applied voltage to the PLZT plate 6 and the plate thickness thereof. If the condition that the electric field vector is rotated by 90° is set, the linearly polarized light emitted from the PLZT plate 6 is passed through the polarizer 2. When no voltage is applied to the PLZT plate 6, the light is in the crossed nicols condition so that the light can not pass through the polarizer 2, namely, the PLZT shutter 3 is in the off state, while when a predetermined voltage is applied to the PLZT plate 6, the light can pass through the PLZT shutter 3, namely, the PLZT shutter 3 is in the on-state. As described above, depending on the voltage applied to the PLZT shutter 3, the on and off condition of the light introduced thereto can be carried out whereby to perform the electro-optic shutter function.

Such PLZT electro-optic shutter has such advantages that it is high speed with response times of the order of micro seconds, made as a full solid state structure, long in life, high in reliability and so on. Accordingly, such a PLZT electro-optic shutter is now applied to, for example, flash brightness prevention shutter, a viewer in stereoscopic television system or a color television receiver employing a black and white television picture tube which was disclosed in Japanese patent application unexamined publication number 55685/1982 (corresponds to U.S. Pat. No. 4,490,739 or a high brightness projector and so on. The color television receiver disclosed in the above Japanese patent application unexamined publication number 55685/1982 will briefly be described hereinafter. At the external side of a face plate of a black and white (monochromatic) television picture tube is disposed a parallel stripe filter formed of red, green and blue color stripes, each being extended in, for example, the vertical direction. Electro-optic shutter elements are disposed at each stripe in opposing relation to the filter. In response to the scanning position of the electron beam at each horizontal scanning line of the picture tube, the electron beams are modulated by the color signals corresponding to red, green and blue colors and the electro-optic shutter element of each stripe is alternately turned on and off in synchronism therewith. Thus, each optical image of each of red, green and blue colors is produced through each stripe filter and hence a color reproduced image can be obtained as a whole.

FIG. 2 shows an example of a construction of a high brightness projector to which the above PLZT electro-optic shutter array is applied. Also in this case, when each element of the electro-optic light shutter array is turned on and off, a picture of one horizontal scanning line is formed sequentially. Namely, in this case, the light emitted from a light source 11 is projected through a collimator lens 12, an iris 13, a linear polarizer 14, a lens system 15 and a mirror 16 to an electro-optic light shutter 17. The light projected on the shutter 17 is made by the iris 13 and the lens system 15 into a light flux of a slit-shape, which slit-shaped flux extends perpendicular to the sheet of drawing of FIG. 2. The shutter 17 comprises PLZT elements which are disposed in stripe shape on a plane at the position irradiated by the above light flux of the slit-shape. Then, in response to the video signal of one horizontal scanning line amount, each element is sequentially turned on and off and the light passed therethrough is projected through an analyzer 18, a condenser lens 19, a movable mirror 20 and a projection lens 21 onto a screen (not shown). In this case, the polarizer 14 and the analyzer 18 respectively correspond to the polarizers 1 and 2 in FIG. 1. The movable mirror 20 is driven or vibrated along the surface of the sheet in FIG. 2, namely, in the horizontal direction shown by arrows, at, for example, one field period. On the other hand, when a video signal of one horizontal scanning line amount is sequentially supplied to each element of the shutter 17 and the movable mirror 20 is driven at each field period in synchronism therewith, a picture of one field amount is sequentially projected onto the screen.

In the color television receiver formed by the combination of the monochromatic cathode ray tube and the electro-optic light shutter or the high brightness projector employing the electro-optic shutter and so on, the driving of the shutter is carried out at a high driving frequency higher than 5 kHz.

PLZT is formed of a mixed system of PbZrO₃, PbTiO₃ and La₂O₃ and the composition formula thereof is expressed by

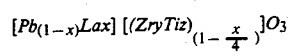

Since its composition is determined by the amounts of La, Zr and Ti, its composition can be given by the expression of x/y/z. In accordance with the composition ratio of the x/y/z, the PLZT is roughly classified into a linear electro-optic effect material which shows a Pockels effect as a mode of birefringence caused by electro-optic effect, quadratic electro-optic effect material which shows a Kerr effect and a memory material which shows a memory effect. The quadratic electro-optic effect material, when applied with the electric field, causes anisotropy in permittivity and birefringence $\Delta_n$. However, if the electric field is removed therefrom, anisotropy in refractive index disappears and becomes isotropic. On the contrary, in the linear electro-optic effect material and the memory material, even if the electric field is removed therefrom, anisotropy remains therein. The relation between the birefringence $\Delta_n$ and the electric field E of each material becomes as shown in FIGS. 3 to 5. These characteristics are shown at room temperature. FIG. 3 shows a case of the linear electro-optic effect having the composition of x/y/z=12/40/60, FIG. 4 shows a case of the quadratic electro-optic effect material having the composition of x/y/z=9/65/35 and FIG. 5 is a case of the memory material which has the memory effect having the composition of x/y/z=8/65/35. FIG. 6 shows the ranges of the compositions bounded by the solid lines which form the memory effect material, the linear electro-optic effect material and the quadratic electro-optic effect material having each composition of x/y/z. In FIG. 6, the value of y increases from right to left and the value z increases from left to right.

In the prior art, PLZT ceramics suitable for the electro-optic light shutter were selected to have the composition of 9.5 to 9.0/65/35 as the quadratic electro-optic effect material. The reason for this is that the PLZT having the above composition can present the quadratic effect at environmental temperatures ranging from −20° C. to 80° C. and can be used as the electro-optic light shutter. However, the temperature characteristic of the quadratic electro-optic coefficient R of the PLZT has a large negative value so that in the use at a temperature higher than room temperature the operation voltage is raised and hence the operational electric power is increased, a discharge between the electrodes occurs and so on, resulting in problems in the use.

On the other hand, when this PLZT is driven by A.C. current, the operational voltage is increased as its frequency is increased. In the graph of FIG. 7, curves 22, 23 and 24 indicate relations of operation voltage vs. output $I/I_0$ (where $I_0$ represents the incident light intensity and I represents the detected light intensity) in the case of D.C. operation, 500 Hz and 5 kHz.

OBJECTS AND SUMMARY OF THE INVENTION

Accordingly, it is an object of the present invention to provide an improved electro-optic light shutter.

It is another object of the present invention to provide a PLZT light shutter which can be operated at low voltage and with low power consumption.

It is a further object of the present invention to provide a PLZT light shutter which can stably operate free from the environment.

According to one aspect of the present invention, there is provided an electro-optic light shutter comprising:

a ceramic body having electro-optic effect;
means to apply A.C. voltage to said ceramic body to cause electro-optic effect in said ceramic body;
means to apply linear polarized light to said ceramic body; and
means to detect light passed through said ceramic body, wherein said ceramic body is formed of PLZT ceramics having memory effect at room temperature and losing said memory effect and exhibiting quadratic electro-optic effect at an elevated operating temperature caused by application of A.C. voltage to said ceramic body.

According to another aspect of the present invention, there is provided an electro-optic light shutter comprising:

a ceramic body having electro-optic effect;
means to apply A.C. voltage to said ceramic body to cause electro-optic effect in said ceramic body;
means to apply linear polarized light to said ceramic body;
means to detect light passed through said ceramic body; and
means to hold said ceramic body at a predetermined elevated operating temperature, wherein said ceramic body is formed of PLZT ceramics having memory effect at room temperature and losing said memory effect and exhibiting quadratic electro-optic effect at said predetermined elevated operating temperature caused by application of A.C. voltage to said ceramic body and said means to hold said ceramic body at a predetermined elevated operating temperature.

The other objects, features and advantages of the present invention will become apparent from the following description taken in conjunction with the accompanying drawings through which the like references designate the same elements and parts.

DESCRIPTION OF THE PREFERRED EMBODIMENT

Figure 2:
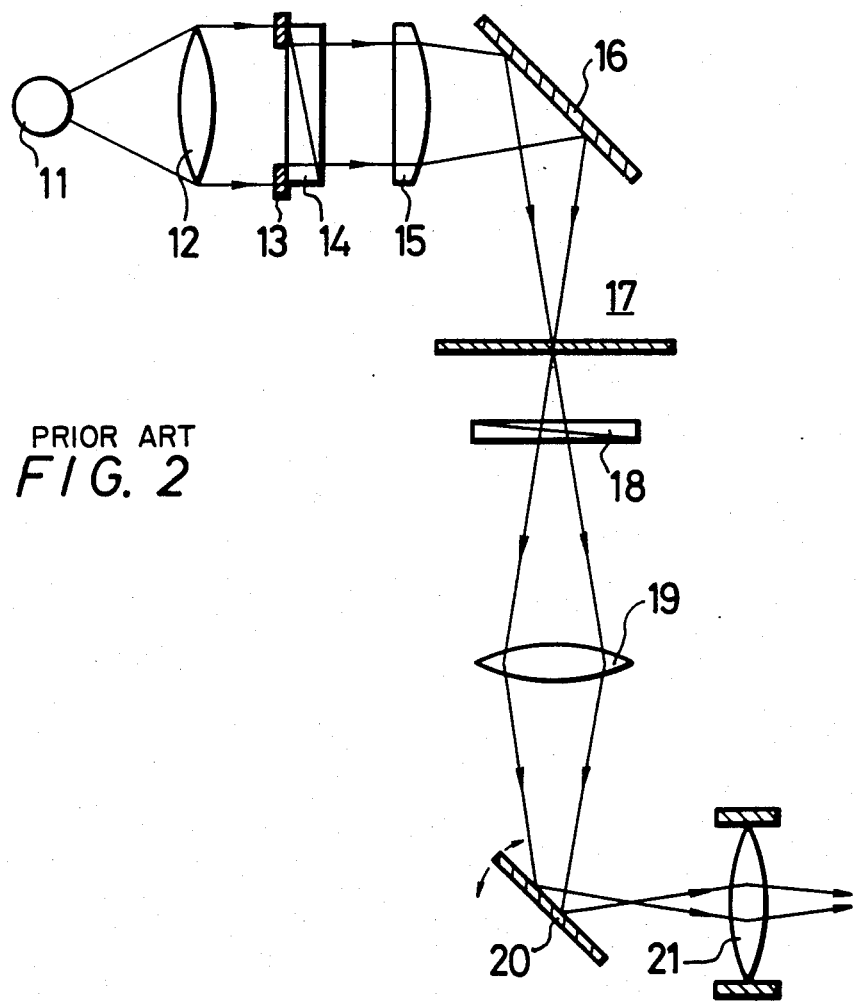
FIG. 2 is a constructional diagram showing an example of a projector which employs an electro-optic light shutter.
Figure 3:
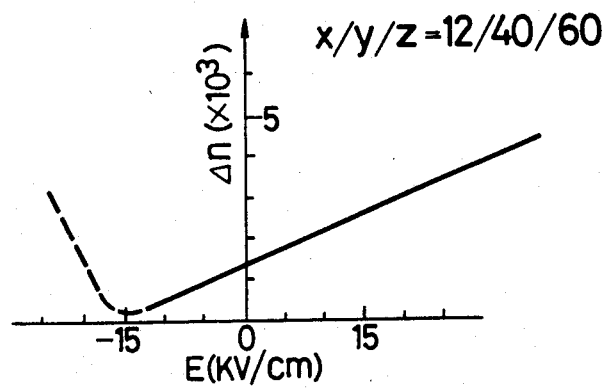
FIGS. 3 to 7 are respectively graphs showing characteristics of PLZT ceramics.
Figure 4:
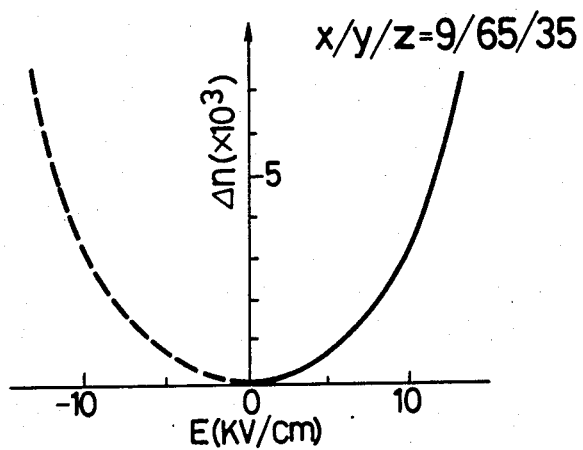
Figure 5:
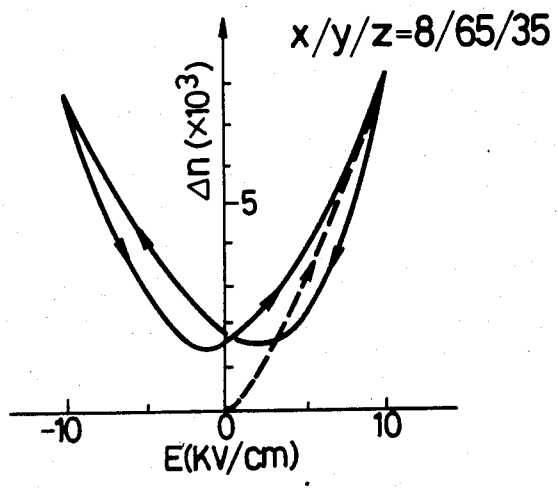
Figure 6:
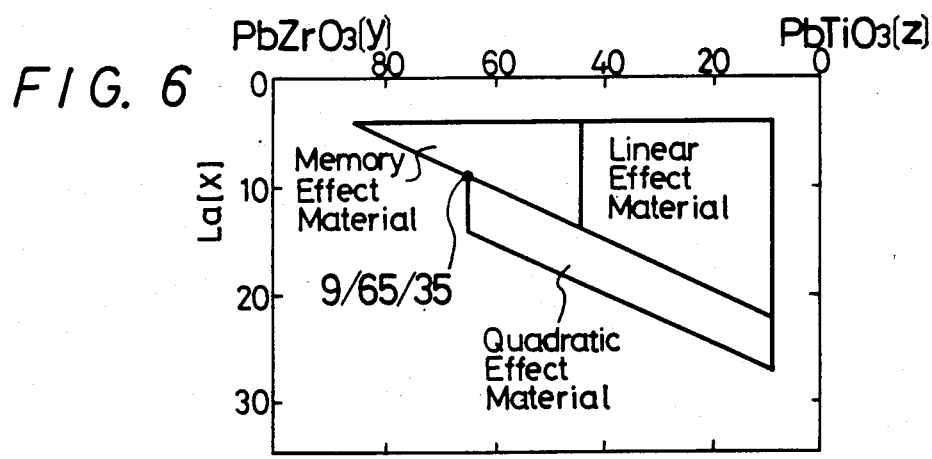
Figure 7:
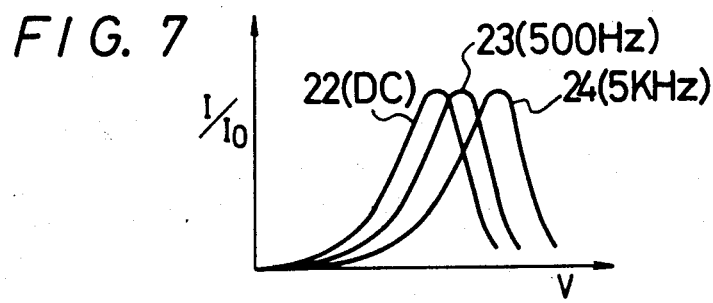

The present inventors, after various experiments and researches, clarified that the increase of the operation voltage as the frequency increases is caused by heat due to dielectric loss of the PLZT. This dielectric loss is expressed by $2\pi CV^2 f \tan \delta$ where $\delta$ is loss angle, V is operation voltage, f is operational frequency and C is capacity between the electrodes. This dielectric loss becomes large as the frequency f becomes large. Due to this heating, the temperature of the PLZT ceramic body itself is raised to cause the operational voltage to be increased in view of the temperature characteristic of the quadratic electro-optic coefficient R. As a result when the electro-optic light shutter is operated at an operational frequency higher than 5 kHz in the color television receiver formed by the combination of the monochromatic picture tube and the electro-optic light shutter or the high brightness projector shown in FIG. 2, the increase of the temperature of the PLZT largely affects the increase of the operational power and the like, resulting in problems.

The operational power P of the PLZT is given as $$P = CV^2 f + 2\pi CV^2 f \tan \delta \quad (1)$$

Since $$V = \sqrt{\frac{\lambda \cdot d^2}{R \cdot n^3 \cdot t}}, \quad C = \epsilon_0 \cdot \epsilon_S \cdot \frac{t \cdot l}{d} \quad (2)$$

$$P = \frac{\epsilon_0 \cdot \epsilon_S \cdot \lambda \cdot d \cdot l \cdot f}{R \cdot n^3} (1 + 2\pi \tan \delta)$$

where $\lambda$ is the wavelength, d is the distance between the pair of electrodes on the PLZT element, t is the thickness of the PLZT element, l is the length of the electrode, n is the refractive index of the PLZT, R is the quadratic electro-optic coefficient and $\epsilon_S$ is the relative permittivity of the PLZT. In the Eq. (2), when d, l, $\lambda$ and f are selected to be constant, it be desired that the coefficient R is as large as possible to enable the PLZT shutter to operate at lower operational voltage and with low power consumption.

According to the present invention, in the electro-optic light shutter formed of electro-optic ceramics and at least a pair of electrodes through which A.C. voltage is applied to the electro-optic ceramics, as, for example, the PLZT ceramics, there is employed a PLZT ceramic which has memory effect at room temperature and of which the memory effect is substantially lost at a constant temperature elevated by the application of the A.C. voltage.

Moreover, in the present invention, the electro-optic light shutter is formed by the PLZT ceramics having the above characteristics. In this case, the electro-optic light shutter is provided with a heating means which holds the PLZT ceramics at the above constant temperature.

It was discovered that in the PLZT having the composition which exhibits a memory effect at room temperature, such PLZT was changed to a quadratic effect material at a temperature higher than a critical temperature which is a higher temperature limit showing the memory effect (hereinafter this temperature is referred to as memory temperature) to establish the function of the electro-optic light shutter, while the electro-optic coefficient R exhibited a large value at a temperature near the memory temperature. On the basis of the above discovery, the PLZT ceramics which constructs the electro-optic light shutter is formed of a composition which exhibits the memory effect at room temperature and exhibits the quadratic effect to an elevated temperature at which the PLZT ceramic is driven by applying A.C. voltage resulting in heat generation or further applying external heating means to hold the PLZT ceramic at the elevated temperature. The PLZT ceramic is driven at the above condition where it has high electro-optic coefficient R.

Now, an embodiment of the electro-optic light shutter according to the present invention will be described. First, a method for forming the electro-optic ceramic body used therein will be described.

Raw materials for providing the PLZT having a desired composition are weighed, mixed by a ball mill at a revolution speed of 60 r.p.m for 15 hours, filtered, dried at 140° C. for 15 hours and temporarily pressed under a pressure of 500 kg/cm². The temporarily pressed body is calcined at 900° C. for 1 hour, then ground by a ball mill rotating at a revolution speed of 60 r.p.m for 15 hours, filtered again, dried at 140° C. for 15 hours and then pressed under a pressure of 1 t/cm². This product is hot pressed at 1250° C. for 4 hours under a pressure of 200 kg/cm² in an oxygen $O_2$ atmosphere. The hot-pressed sintered product thus made was sliced into thin wafers, lapped at both surfaces and then mirror-finished.

Figure 8:
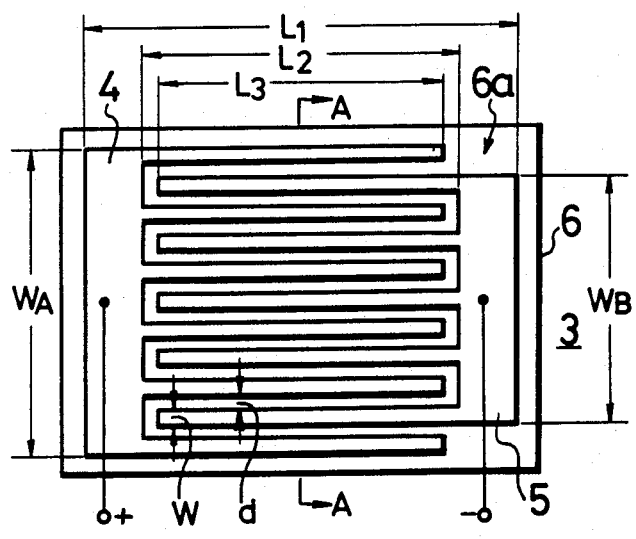
FIG. 8 is a schematic plan view illustrating an embodiment of an electro-optic light shutter according to the present invention.
Figure 9:
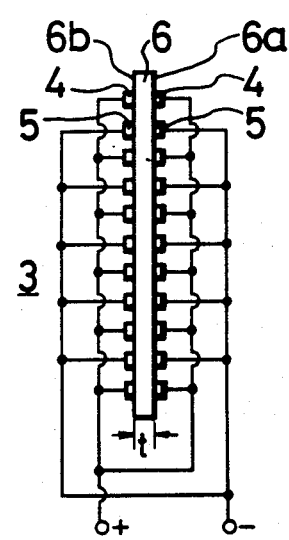
FIG. 9 is a cross-sectional view taken along a line A—A in FIG. 8.

Electrodes are deposited on the plate shape PLZT ceramic body. An example thereof is shown in FIGS. 8 and 9. In this example, the electrodes are deposited according to the surface electrode method. On each of both major surfaces 6a and 6b of the PLZT ceramic body 6 are deposited a pair of comb-tooth electrodes 4 and 5, the comb teeth of which are alternately opposed to and formed in parallel to each other. And, a predetermined operational voltage is applied between the pair of electrodes 4 and 5. In the case, the electrodes corresponding to each other on both major surfaces 6a and 6b, namely, the electrodes 4 and the electrodes 5, each having the same polarity, are disposed in opposing relation thereto through the PLZT ceramic body 6. These electrodes 4 and 5 are formed by a printing method employing silver paste or a metal vacuum deposition in which Cr is deposited to a thickness of 1000 Å on which Au is further deposited to have a thickness of 4000 Å. According to the surface electrode method, in order to present the parallel electric field, it is desired that a spacing d between the electrodes 4 and 5 on the surfaces 6a and 6b is increased, while the spacing between the surfaces 6a and 6b, namely, the thickness t of the sintered product 3 is reduced.

The PLZT ceramic body 6 is made to have the composition which exhibits the memory effect at room temperature as described before.

Figure 10:
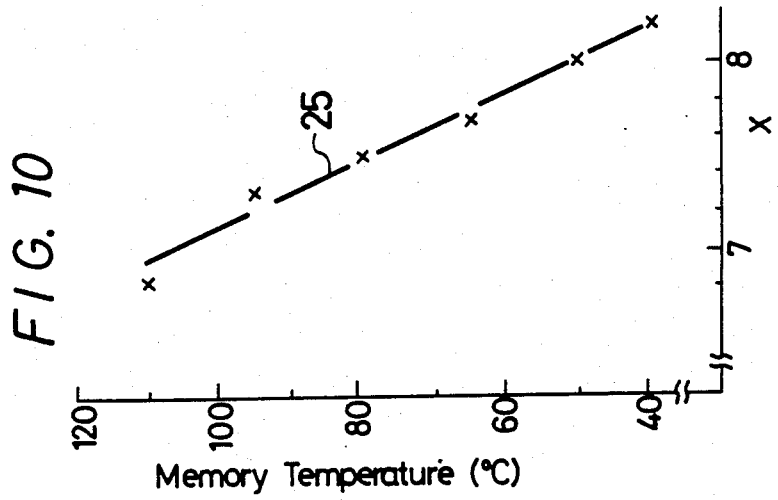
FIG. 10 is a graph showing a relation between a PLZT composition and a memory temperature.

In the composition x/65/35 of the PLZT body 6, the memory temperature of each composition in which the value x is changed was measured and the results thereof are shown by a curve 25 in FIG. 10. It was confirmed that the memory effect was presented in the temperature region below the curve 25 for each value of x, while the quadratic electro-optic effect was presented in the region above the curve 25. In this case, the applied operational voltage is a DC voltage.

Figure 1:
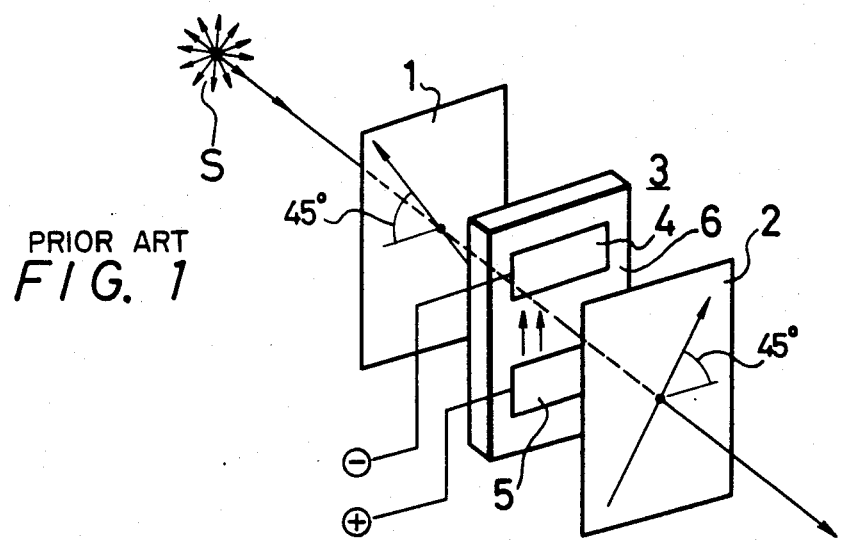
FIG. 1 is a constructional diagram of an electro-optic light shutter.
Figure 11:
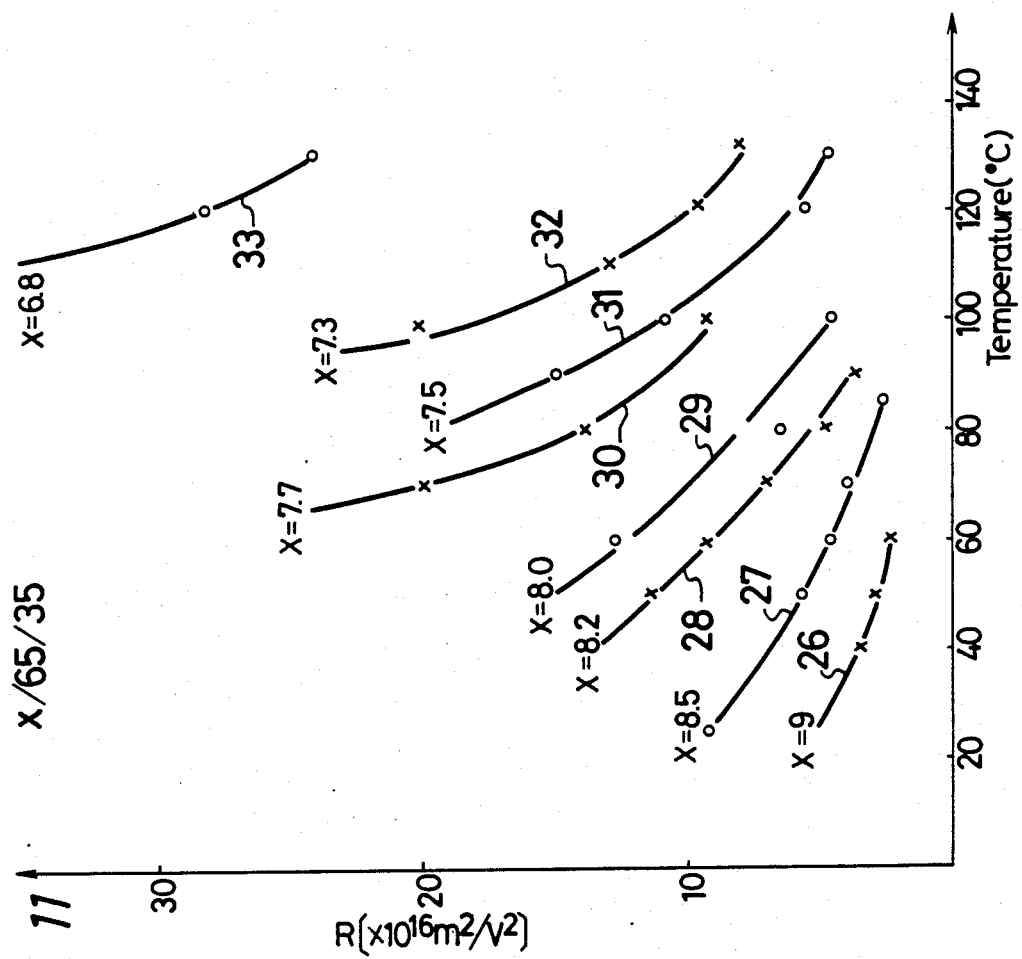
FIG. 11 is a graph showing measured results of a temperature dependency of a quadratic electro-optic coefficient R of the PLZT.

Further, in this PLZT, the measured results of the temperature characteristic of the electro-optic coefficient R for the PLZT having the composition of x/65/35 when the value of x is changed are shown in FIG. 11. In FIG. 11, curves 26 to 33 respectively represent the temperature characteristics of the electro-optic coefficient R at a temperature higher than room temperature in which x=9, x=8.5, x=8.2, x=8.0, x=7.7, x=7.5, x=7.3 and x=6.8. In this case, He-Ne laser (whose wavelength is 633 nm) was used as its light source and the light amount from the analyzer in the construction disposed as shown in FIG. 1 was measured. In this case, the temperature at the left-hand side end of each curve represents the memory temperature and a case where the contrast ratio indicates a value larger than 1/10 is regarded as the case which presents the memory effect. The contrast ratio is the ratio of the amount of light passing through the shutter in its off state to the amount of light passing through in its on state. As will be clear from this graph, a electro-optic coefficient R indicates the larger value as the temperature becomes closer to the memory temperature.

Similarly in the PLZT having the composition of x/65/35, the halfwave voltage $V(\lambda/2)$ vs. the temperature of the PLZT ceramic body 6 in the case where the similar He-Ne laser was used as the light source and the electro-optic light shutter 3 was operated for approximately one second by applying A.C. voltage of square wave with the frequency of 5.25 kHz between the pair of comb tooth electrodes 4 and 5 shown in FIGS. 8 and 9 was measured. The halfwave voltage is the minimum voltage providing the maximum transmittance upon increasing the voltage applied to the PLZT plate. The measured results are indicated by a cross mark 41 and curves 34 to 40 in FIG. 12. The cross mark and curves 34 to 41 are respectively cases where x=9, x=8.5, x=8.0, x=7.7, x=7.5, x=7.3, x=7.0 and x=6.8. At the temperature lower than each cross-mark point, the memory effect is presented, namely, the contrast ratio exceeds 1/10. In this case, a distance $L_1$ between the outer edges of the coupling portions of each comb tooth of the pair of comb tooth electrodes 4 and 5 is selected as 9.6 mm, a distance $L_2$ between the inner edges thereof is selected as 8.6 mm, a length $L_3$ between the tip ends of each comb tooth is selected as 7.6 mm, an outside width $W_A$ of one electrode 4 is selected as 7.6 mm and an outside width $W_B$ of the other electrode 5 is selected as 6.6 mm. Further, in this case, the space d of the electrodes 4 and 5 is selected as 430 $\mu$m, the comb tooth width w is selected as 120 $\mu$m and the thickness t of the ceramic body 6 is selected as 300 $\mu$m. From FIG. 12, the temperatures T of the ceramic body 6 and the halfwave voltages $V(\lambda/2)$ are extracted and tabulated on the following Table 1.

TABLE 1

| sample No. | composition (x/y/z) | halfwave voltage $V\frac{\lambda}{2}$ (volts) | | |
|---|---|---|---|---|
| | | T = 60° C. | T = 80° C. | T = 100° C. |
| No. 1 | (8.5/65/35) | 340 | 395 | 460 |
| No. 2 | (8.0/65/35) | 260 | 330 | 400 |
| No. 3 | (7.7/65/35) | 200 | 270 | 340 |
| No. 4 | (7.5/65/35) | memory | 200 | 260 |
| No. 5 | (7.3/65/35) | memory | 135 | 190 |
| No. 6 | (7.0/65/35) | memory | memory | 120 |
| No. 7 | (6.8/65/35) | memory | memory | memory |

From the above results, it is clear that if the PLZT temperature in the use state of the electro-optic light shutter is determined, the optimum composition of PLZT for minimizing the halfwave voltage $V(\lambda/2)$ can be determined. For example, when the PLZT temperature is selected as 80° C., it is understood from the Table 1 that the corresponding optimum composition is x/y/z=7.3/65/35 and the operational voltage is 135 V. If this is compared with the case of x/y/z=8.5/65/35, this composition requires the operational voltage of 395 V. Namely, in the Table 1, as compared with the electro-optic light shutter employing the sample No. 1, the electro-optic light shutter employing the sample No. 5 can reduce the operational voltage to ⅓. In this case, although the operational power is in proportion to the square of the operation voltage, since depending on each composition, relative permittivity $\epsilon_S$ and dielectric loss angle $\delta$ become different by temperature and operational voltage, it can not simply be considered that the operational power is in proportion to the square of the operational voltage.

Furthermore, in the present invention, there is provided heating means which externally sets the temperature in the operation of the PLZT ceramic body 6 as a predetermined temperature free from the environmental temperature. That is, in the PLZT, (a) As the environmental temperature is changed, the temperature of the PLZT ceramic body is changed.
(b) When the operational voltage and the operational frequency are changed, the temperature of PLZT ceramic body is changed.
(c) When the composition of the PLZT is changed, the halfwave voltage $V(\lambda/2)$ is changed and the operational voltage is changed so that the temperature of the PLZT ceramic body is also changed.

In consequence, when the PLZT temperature is changed due to the reasons of (a) to (c), its quadratic electro-optic coefficient R is changed. To avoid this, the PLZT ceramic body 6 is held at a constant temperature by the controlled heating means.

The PLZT temperatures of the sample Nos. 1, 2, 3, 4, 5 and 6, each having the composition shown on the Table 1 in which the environmental temperature is 25° C. and the operational voltage is selected as 150 V and 200 V free from the heating means were measured. The measured results are shown on the following Table 2.

TABLE 2

| | PLZT temperature T(°C.) | |
|---|---|---|
| SAMPLE NO. | at 150 volts | at 200 volts |
| NO. 1 | 52 | 67 |
| NO. 2 | 65 | 80 |
| NO. 3 | 67 | 77 |
| NO. 4 | 77 | 91 |
| NO. 5 | 86 | 94 |
| NO. 6 | 98 | 110 |

Figure 12:
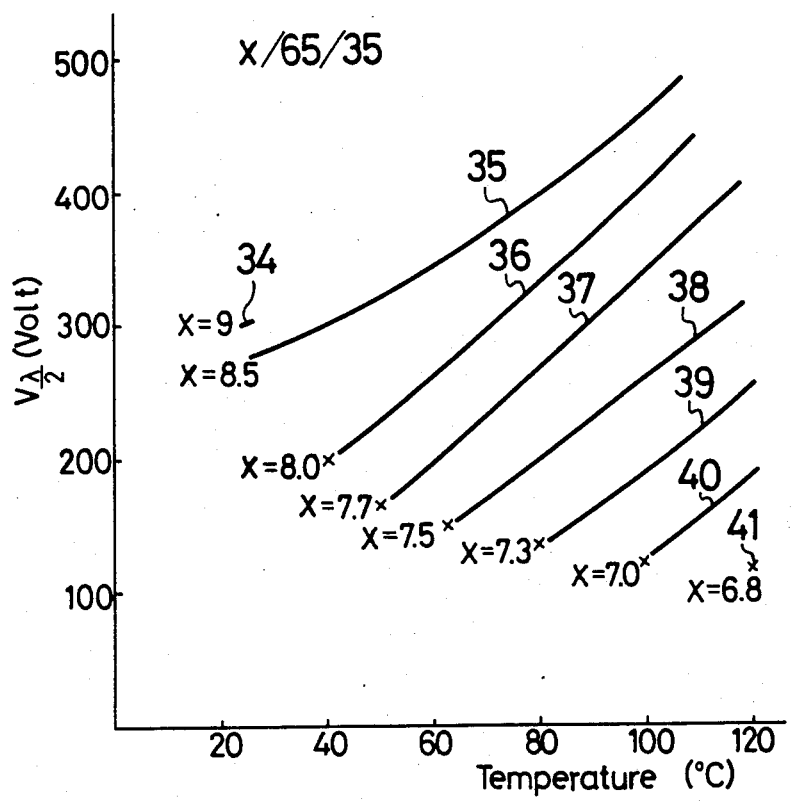
FIG. 12 is a graph showing measured results of a temperature dependency of a halfwave voltage.

The optimum PLZT composition under the environment of the room temperature (25° C.) is determined by comparing the graph of FIG. 12 and the Table 2, the composition of the sample No. 5, namely, 7.3/65/35 is the best one. The temperature of the PLZT ceramic body having the composition of 7.3/65/35 at the operational voltage of 150 V is 86° C. and the halfwave voltage $V(\lambda/2)$ at 86° C. becomes 150 V, which then correspond to each other in the Table 2 and the graph of FIG. 12. While in this embodiment the environment is made constant, the environmental fluctuation ranging at least from −10° C. to 40° must be taken into consideration in the practical apparatus. In the environmental fluctuation, it is considered that in practice, the PLZT temperature ranges from 86° C.−35°=51° to 86° C.+15° C.=101° C. Since the memory temperature of the PLZT having the composition of 7.3/65/35 is 80° C., this PLZT exhibits the memory effect at environmental temperature −10° C. and PLZT temperature 51° C. so that the normal shutter operation can not be presented. Further, under the condition that the environmental temperature is 40° C. and the PLZT temperature is 101° C., it is clear from the straight line 39 in FIG. 12 that the operational voltage must be selected more than 175 V. In this way, as the operational voltage is increased, also the PLZT temperature is elevated by its driving, thus increasing the operational voltage more. As a result, as compared with the operational voltage 150 V at the environmental temperature of 25° C., a large operational power is required by the elevated environmental temperature. For this reason, as the environmental temperature is changed, the PLZT temperature is changed so that the operation of the electro-optic light shutter becomes impossible and the operational voltage therefor is greatly changed. And, in response to the change of the environmental temperature, the operational voltage is changed so that it becomes necessary to compensate in temperature the operational voltage in the driving circuit.

Figure 13:
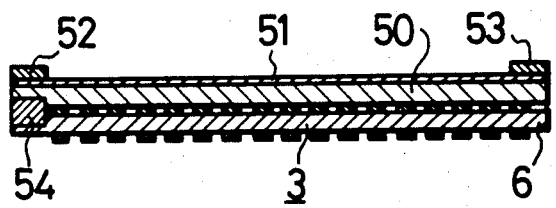
FIG. 13 is a constructional diagram showing a main part of the embodiment of the electro-optic light shutter according to the present invention.

The influence of the environmental temperature can be avoided by the provision of the afore-mentioned external heating means. Namely, a heating means is provided at the outside of the PLZT ceramic body 6 which holds it at a constant temperature. This external heating means can be constructed such that a heating member and a temperature sensor which detects the temperature of the PLZT ceramic body 6 and then controls the heating member to always hold the PLZT ceramic body 6 at a predetermined temperature are disposed considerably close to the PLZT ceramic body 6. By way of example, as, for example, shown in FIG. 13, a transparent substrate 50 made of glass substrate or the like is bonded to the PLZT ceramic body 6 on its one surface by adhesive agent and the like and on this substrate 50 is deposited a transparent resistive layer, for example, $SnO_2$. On one surface of the plate glass 50 of, for example, $8 \times 7 \times 0.3$ mm is deposited a heater 51 which is formed by a transparent resistive layer having resistivity of 25 $\Omega/\square$, conductive terminals 52 and 53 are deposited on both ends of the heater 51 and a voltage is applied across the conductive terminals 52 and 53. On the other hand, a temperature detecting element 54 such as a thermistor or the like is disposed in contact with the PLZT ceramic body 6 and by a signal detected by the temperature detecting element 54, the power source circuit (not shown) for the heater 51 is controlled so as to maintain the PLZT ceramic body 6 at a constant temperature, namely, a temperature higher than the memory temperature, for example 120° C. The above temperature detection can also be carried out in such a manner that a capacitor is formed by employing the PLZT ceramics per se and the temperature is detected by the change of the capacity of the capacitor. In this case, a pair of electrodes are provided on the PLZT ceramics to form the capacitor and the heater is controlled in response to the change of the capacity of the capacitor. When, now, the composition of the PLZT ceramic body 6 is 7.0/65/35, the operation voltage becomes 180 V at 120° C. as is seen from the curve 40 in the graph of FIG. 12. In this connection, when the PLZT ceramics is operated by the operation voltage of 180 V without the external heating, its PLZT temperature was 105° C. at the environmental temperature of 25° C. However, in the PLZT ceramics provided with the above heating means, when the environmental temperature thereof is changed in a range from, for example, $-10°$ C. to 40° C., only the heater power which is required to hold the PLZT ceramic body at the temperature of, for example, 120° C. is increased and/or decreased but the PLZT temperature becomes constant. Thus, the operational voltage thereof becomes constant and the operational power of the PLZT ceramic body 6 in that case became 1.5 W. In this case, the heater power was 0.5 W at the environmental temperature of 0° C. and 0 W at the environmental temperature of 40° C. In this connection, under the condition that the temperature is not controlled, the PLZT ceramic body 6 having the composition of 7.3/65/35 requires the PLZT operational power of 1.5 W in the environment of 25° C. and 2.3 W in the environment of 40° C. When the PLZT ceramic body 6 having the composition of 8.5/65/35 was employed, the required PLZT operation power was 10.6 W in the environment of 25° C.

In the case of the above heating method employing the heater, it takes, 5 seconds for the electro-optic light shutter to reach the temperature at which it starts its operation as the shutter from the room temperature with the initial heater power of 2.5 W.

As set forth above, according to the electro-optic light shutter of the present invention, the PLZT ceramic body having the characteristic which exhibits the memory effect at the room temperature but the quadratic effect at the temperature for carrying out the electro-optic light shutter operation is employed so that the operation voltage can be lowered, accordingly, the electro-optic light shutter can be operated at low voltage. Further, when the external heating means is provided to hold the PLZT temperature constant and the PLZT temperature is held constant free from the environment in use of the electro-optic light shutter, the operational voltage can be made constant and the rising-up time of the electro-optic light shutter when it starts the operation of the shutter can be reduced, and furthermore, the total power consumption of the shutter can be decreased relatively.

Since the operational voltage of the PLZT shutter is lowered as described above, a reliability regarding the discharge between the electrodes of the PLZT shutter can be raised, the power of the PLZT electro-optic light shutter driving circuit itself can be reduced, the reliability thereof can be raised and the manufacturing cost thereof can be decreased, too.

Moreover, the noise level caused by the PLZT ceramic body can be decreased and the long-term reliability of the PLZT itself can be raised and so on. Furthermore, owing to the reduction of the electric power, a battery can be used as the power source, thus bringing about an advantage that the application field of the electro-optic light shutter in various portable apparatus can be widened considerably.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:
1. An electro-optic light shutter comprising:
 a ceramic body composed of a PLZT ceramic whose composition is such that it has a memory effect at room temperature and loses the memory effect and exhibits a quadratic electro-optic effect at an elevated temperature above room temperature,
 means for applying a linear polarized light to said ceramic body,
 means to detect light passed through said ceramic body,
 means for applying an operational voltage to said ceramic body, means for applying an AC voltage to heat said ceramic body at least to said elevated temperature, said composition, operational voltage, and AC voltage being selected such that the operational power utilized by said body is substantially minimized.

2. An electro-optic light shutter according to claim 1, wherein said means to apply linear polarized light to said ceramic body and said means to detect light passed through said ceramic body are, respectively, a polarizer and analyzer, both being arranged so that the transmission axis of the polarizer and the analyzer are perpendicular to each other.

3. An electro-optic light shutter according to claim 1, wherein said means to apply an A.C. voltage to said body is a pair of electrodes disposed on said ceramic body.

4. An electro-optic light shutter according to claim 1 which includes a heater provided near said ceramic body to hold said body at a predetermined temperature.

5. An electro-optic light shutter according to claim 1, wherein said heater is made of transparent resistive material.

6. A light shutter according to claim 1 wherein said PLZT ceramic contains 7.3 mol proportions of La, 65 mol proportions of Zr, and 35 mol proportions of Ti.

7. A light shutter according to claim 1 wherein said PLZT ceramic contains 7.5 mol proportions of La, 65 mol proportions of Zr, and 35 mol proportions of Ti.

8. A light shutter according to claim 1 wherein said PLZT ceramic contains 7.7 mol proportions of La, 65 mol proportions of Zr, and 35 mol proportions of Ti.

* * * * *